Jan. 16, 1968  G. L. WILMOT ET AL  3,363,769
SLURRY DEWATERING APPARATUS
Filed Nov. 19, 1964  2 Sheets-Sheet 1

INVENTORS
GEORGE L. WILMOT
JAMES L. KEARNS &
HAROLD C. JEPPSEN
BY John F. A. Earley
ATTORNEY

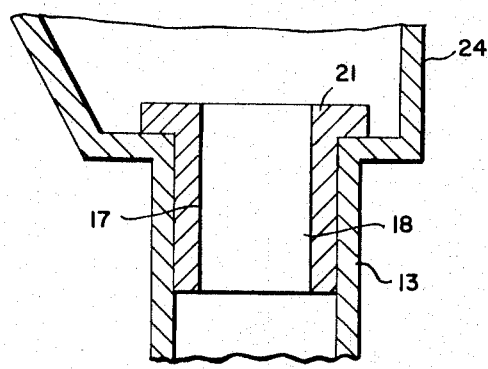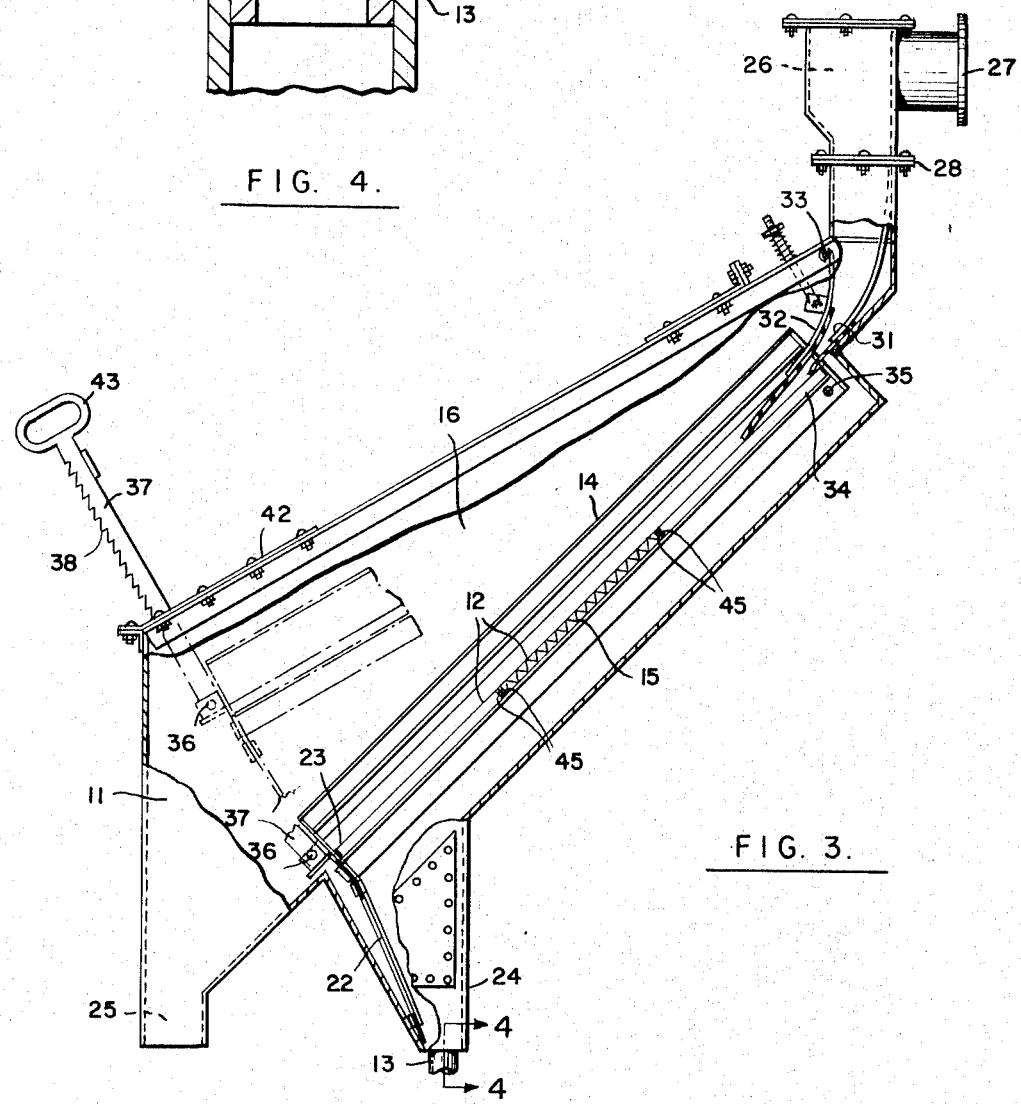

** 3,363,769
SLURRY DEWATERING APPARATUS**
George L. Wilmot, Pocono Lake, James L. Kearns, White Haven, and Harold C. Jeppsen, Weatherly, Pa., assignors to Wilmot Engineering Company, White Haven, Pa., a corporation of Pennsylvania
Filed Nov. 19, 1964, Ser. No. 412,359
7 Claims. (Cl. 210—251)

ABSTRACT OF THE DISCLOSURE

A sieve apparatus for dewatering a slurry of water and solid particles comprising a housing, a sieve panel supported in the housing, ratches for adjusting the angle of inclination of the sieve panel, flexible sealing means between the sieve panel and the housing, bushings in outlet pipes below the sieve panel which combine with the flexible sealing means to create a suction through the sieve panel to assist the gravity dewatering action thereof, and a self-adjusting flow plate to distribute slurry evenly over the sieve panel.

---

This invention relates to slurry dewatering apparatus and the like, and more particularly concerns apparatus for removing the water from a coal-water mixture, or removing the water from a coal-magnetite-water slurry media used in cleaning coal.

Conventional slurry dewatering apparatus utilized a screen, which was vibrated, and over which the slurry to be dewatered was passed. The screen was positioned horizontally. In such devices it was a problem to insure that the slurry passed over the screen in a uniform fashion. Also, the solid particles in the slurry would tend to build up on top of the screen and form a dam until the water pressure behind the dam became strong enough to disperse the pile of particles and move them along the screen. This flooding effect or splashing was undesirable because it interfered with the continuous operation of the apparatus.

Another problem of conventional devices was the great amount of space that they occupied.

Accordingly, it is an object of this invention to overcome the problems of the prior art and provide a slurry dewatering apparatus of improved construction and operation.

It is another object to provide such apparatus which is adjustable so as to obtain the optimum velocity of the slurry as it is being dewatered.

It is another object to provide apparatus which operates in a positive manner to pull the water out of the slurry through the use of suction forces.

It is another object of the invention to provide apparatus which spreads the slurry and gives it a laminar flow.

Other objects and advantages of the invention, including its simplicity and economy, as well as the ease with which it may be adapted to existing equipment, will further become apparent hereinafter and in the drawings, in which:

FIG. 3 is a view in side elevation, and partly in section, of the apparatus; and FIG. 4 is a view in section, on an enlarged scale, taken as indicated by the lines and arrows 4—4 which appear in FIG. 3.

Figure 1:
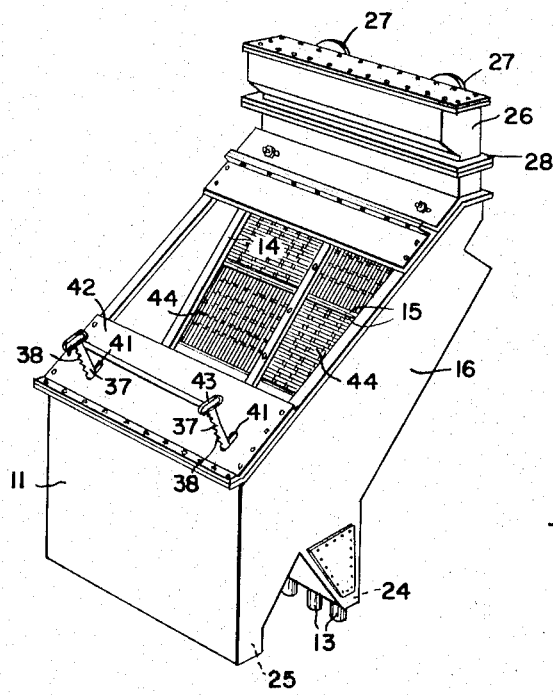
FIG. 1 is a view in perspective of a slurry dewatering apparatus constructed in accordance with this invention.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a slurry dewatering apparatus which comprises a housing 11, a plurality of sieve panels 12 positioned in housing 11, effluent pipes 13 leading from the housing beneath the sieve panels 12, and means for creating a vortex in effluent pipes 13 to thereby provide a suction through sieve panels 12. This suction causes a highly efficient dewatering of the slurry passing over sieve panels 12 by pulling the water from the slurry and through the sieve panels 12. The suction means includes a pair of resilient seals 14 which are mounted on the sides of sieve panel frame 15 which supports the sieve panels 12. Seals 14 extend outwardly to make contact with side walls 16 of housing 11.

Figure 2:
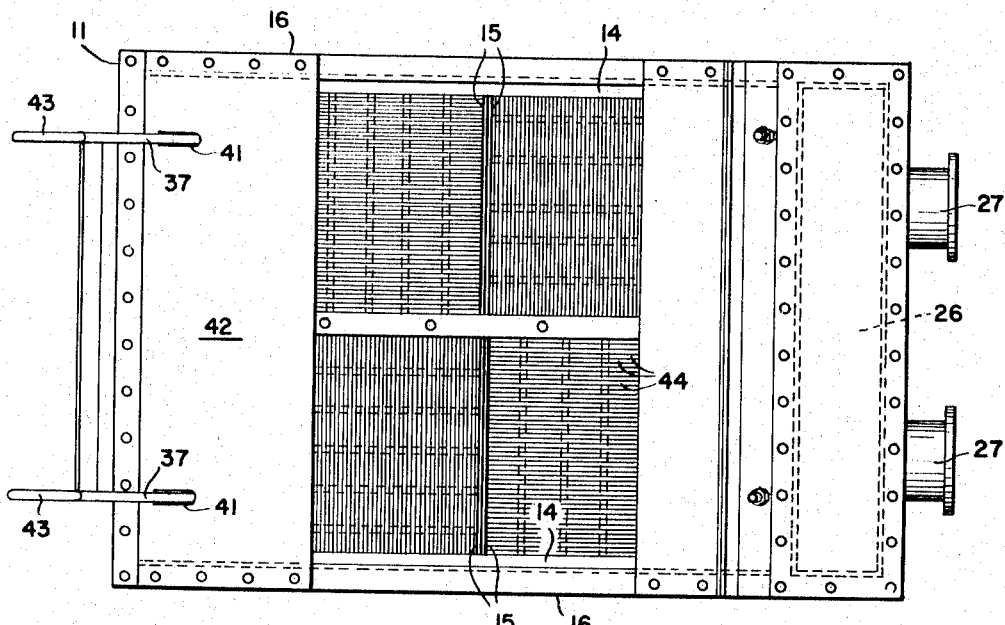
FIG. 2 is a view in top plan of the apparatus of FIG. 1.

The suction means also includes bushings 17 which have a cylindrical portion 18 which fits inside effluent pipes 13, and a flange 21 which is wider than the inside diameter of the effluent pipes so as to seat properly therein. Bushings 17 are provided in various sizes so as to provide the desired vortex in the effluent for various types and concentrations of slurry, and a hand-hole opening is provided in side wall 16 near pipes 13 for easy changing of bushings 17. A removable cover and gasket are bolted over the hand-hole opening, as shown in FIGS. 1 and 2.

A bottom seal 22 is mounted on discharge end 23 of sieve panel frame 15 by a flexible hinge member, and extends into effluent chute 24 to prevent passage of effluent into discharge chute 25 which is positioned at one end of housing 11. Seal 22 has a steel frame which is provided with a resilient seal that extends outwardly from its sides and downwardly from its bottom. Bushings 17 and seals 14, 22 cooperate in providing the suction through sieve panels 12 which causes a highly efficient dewatering of the slurry by pulling the water from the slurry and through the sieve panels.

At the top of housing 11 is positioned a feed box 26 through which the slurry is fed by gravity, or by pumping and discharging at atmospheric pressure. Feed box 26 is provided with entrance ports 27, and is bolted to housing 11 at flange 28. This arrangement allows for positioning entrance ports 27 in any direction, and provides for changing the direction by merely unbolting feed box 26, re-positioning it, and rebolting box 26 to housing 11.

The slurry flows by gravity from feed box 26 into the upper end of housing 11 which is fitted with a curved back plate 31, and a self-adjusting flow plate 32 that is pivoted at 33 so that flow plate 32 rides on top of the slurry. Flow plate 32 and back plate 31 are made of steel with edge members that are made of a resilient material, such as rubber. Plates 32, 31 constrict and transversely distribute the slurry evenly over the full width of sieve panels 12 to give the slurry a laminar flow.

The velocity of the slurry flow is controlled by adjusting the pitch of sieve panel frame 15 which has its feed end 34 pivotally connected to housing 11 at pivot pin 35. Discharge end 23 of sieve panel frame 15 has pivotally connected thereto, by pivot pin 36, a pair of ratches 37 having teeth 38. Ratches 37 extend through slots 41 formed in top plate 42 of housing 11 and are provided with handles 43. To change the pitch of sieve panel frame 15, an operator grips handles 43 and pushes away from teeth 38 so as to release the teeth from engagement with top plate 42, and then raises or lowers ratch 37 as desired. When sieve panel frame 15 is raised above its lowermost position, bottom seal 22 prevents the effluent which passes through sieve panels 12 from passing onward to discharge chute 25 and assures that the effluent is directed toward effluent chute 24 and pipes 13.

Sieve panels 12 comprise a series of wedge-type triangular-shaped stainless steel bars 44 mounted in parallel fashion in a square rim 45. The top of the screen surface formed by bars 44 is flush with the top of rim 45. The depth of the slurry passing over the screen panels decreases toward the discharge end of sieve panel frame 15 because of the water being lost through the sieve panels 12.

The velocity of slurry flow is dependent upon the size of the openings between wedge bars 44, since the wider these openings are, the more particles pass through. The velocity of slurry flow also varies with the position of the openings, whether they be parallel or transverse to the direction of slurry flow. More particles wedge in parallel openings than in transverse openings, and thereby blind a greater portion of the sieve, and this affects the velocity of the flow. Sieve panels 12 are designed to be placed with their wedge bars either parallel or transverse to the direction of flow, or they may be placed with some panels 12 having bars in parallel and other panels 12 having bars transverse to the direction of flow.

In operation, the slurry is fed into the feed box 26 and flows by gravity through the upper entrance to housing 11 between curved back plate 31 and self-adjusting flow plate 32 which constrict and transversely distribute the slurry evenly over sieve panels 12 and give the slurry a laminar flow. As the slurry passes downwardly over the sieve panels 12 toward discharge chute 25, the water is drawn from the slurry through panels 12 by gravity and by the suction forces developed through the action of bushings 17 and seals 14 and 22, and forms an effluent which flows downwardly into and through effluent chute 24 and passes out from the apparatus through effluent pipes 13. The solids which remain on top of panels 12 pass downwardly into and through discharge chute 25.

The dewatering action of the apparatus produces a cake of solids containing only enough water to enable the cake to slide from the end of sieve panel frame 15 into discharge chute 25.

The size of the slot openings in sieve panels 12 controls the amount and size of solid particles which are removed from the slurry and pass through sieve panels 12 in the form of effluent into chute 24 to be discharged.

For purposes of illustrating the invention, it has been described in reference to a coal-water slurry operation. However, the term "water" includes any liquid, and the term "solid particles" may be coal, magnetite and coal, sand, gravel, or other solid particles.

The wedge-type triangular-shaped bars 44 are preferred because the triangular shape of bars 44 and the square shape of rim 45 give longer life to sieve panels 12. When panels 12 are installed with bars 44 positioned transversely to slurry flow, the wear occurs on the leading edge of the bars. When this edge becomes worn, the sieve panels 12 may be turned around 180° to present the trailing edge to the direction of slurry flow, thereby doubling the life of the sieve panels.

The adjustability of the pitch of sieve panel frame 15 is an important feature of the invention. A coal-water slurry having a 20% by weight concentration of solid particles flows better at one slope than at another, and a 30% concentration slurry flows better at a different slope.

The size of the particles in the slurry also affects the optimum slope. If the slope is not steep enough, large particles of the coal tend to build up on the screen surface to form a dam which is then suddenly released as the water pressure fills up behind the dam. This gives an undesirable flooding condition in the discharge, undesirable because the discharge is sporadic and not continuous.

Flow plate 32 prevents splashing of the slurry and is especially advantageous when the slurry contains magnetite which is a very sticky material that is difficult to handle.

The slurry dewatering apparatus of the present invention occupies less space than the conventional apparatus. The adjustability of the pitch of sieve panel frame 15 allows for controlling the velocity of slurry flow, and this is of considerable advantage. It is to be noted that the pitch of panel frame 15 may be adjusted without shutting down the machine. The suction forces insure a highly efficient dewatering action. Sieve panels 12 are individually replaced if damaged or worn, and are interchangeable.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:

1. Apparatus for dewatering a slurry of liquid and solids, comprising a housing having an upper entrance and side walls and a discharge chute at one end, a feed box connected to said housing, said upper entrance including a curved back plate and a self-adjusting flow plate for constricting and transversely distributing the slurry evenly, a sieve panel frame having a feed end pivotally supported in said housing and having a discharge end, a ratch pivotally mounted on the discharge end of the sieve panel frame and constructed to be selectively engaged and disengaged with the housing for adjusting the pitch of the seive panel frame, a plurailty of sieve panels mounted in said frame, an effluent chute formed in the housing beneath the sieve panel frame, effluent pipes leading from the effluent chute, a resilient seal mounted between the sieve panel frame and the side walls of the housing, a bottom seal mounted on the discharge end of the sieve panel frame and extending into the effluent chute to prevent passage of effluent into the discharge chute, and bushing means mounted in said effluent pipes for creating a vortex in said pipes, the bushing means and said seals providing a suction through the sieve panels and causing a highly efficient dewatering of the slurry by pulling the water from the slurry and through the sieve panels by suction.

2. Sieve apparatus for dewatering a slurry of water and solid particles comprising a housing having an inlet, a sieve panel frame with sieve panel means supported in the housing, means for adjusting the angle of inclination of the sieve panel frame with respect to the housing and to the horizontal, flexible sealing means between the panel frame and the housing means including said flexible sealing means for creating a suction through the sieve panel means to assist the gravity dewatering action thereof, and an effluent chute forming part of the housing and leading therefrom for removing the slurry which has passed through the sieve panel means.

3. The sieve apparatus according to claim 2, wherein said sieve panel frame has a discharge end at the lower portion thereof having a flexible hinge member with a first seal means extending downwardly and laterally therefrom against the inside of the said effluent chute of said housing, and a second seal means extending from the sides of the frame against the inside of the housing, said first and second seal means combining to maintain the suction in the housing beneath the sieve panel.

4. The sieve apparatus according to claim 2, wherein said effluent chute includes an effluent pipe and wherein said suction means includes a bushing mounted in said effluent pipe.

5. The sieve apparatus according to claim 2, wherein the sieve panel means comprises four sieve panels mounted in said frame which is pivotally supported in the housing, each sieve panel including a series of stainless steel bars of triangular cross section mounted parallel to each other in a square rim, with each sieve panel being removably mounted in the frame so as to be able to be arranged to present its bars parallel or transverse to the direction of slurry flow.

6. The sieve apparatus according to claim 2 wherein said housing has an upper end, including a curved back plate and a self-adjusting flow plate positioned in said upper end for constricting and transversely distributing the slurry evenly over said sieve panel means.

7. The sieve apparatus according to claim 2, wherein the means for adjusting the angle of inclination of the sieve panel frame includes a ratch connected to the sieve panel frame and constructed to be selectively engaged and disengaged with the housing so that the ratch may be raised or lowered to adjust the pitch of the sieve panel frame without shutting down the sieve apparatus.

References Cited

UNITED STATES PATENTS

| | | | |
|---|---|---|---|
| 262,702 | 8/1882 | Sears et al. | 210—482 |
| 1,247,620 | 11/1917 | Bell | 209—413 X |
| 1,537,818 | 5/1925 | Griffith | 210—455 X |
| 2,335,084 | 11/1943 | Rice | 209—363 X |
| 2,585,719 | 2/1952 | Alvord | 209—393 |
| 2,588,088 | 3/1952 | Cover | 210—389 X |
| 2,682,338 | 6/1954 | Hurst | 210—389 X |
| 3,024,914 | 3/1962 | Robson | 210—456 |

FOREIGN PATENTS

| | | |
|---|---|---|
| 62,995 | 6/1891 | Germany. |
| 727,494 | 1/1943 | Germany. |
| 703,185 | 1/1954 | Great Britain. |

REUBEN FRIEDMAN, *Primary Examiner.*

W. S. BRADBURY, *Assistant Examiner.*